(12) United States Patent
Ichikawa et al.

(10) Patent No.: US 9,415,807 B2
(45) Date of Patent: Aug. 16, 2016

(54) VEHICULAR COWL STRUCTURE

(71) Applicants: Akira Ichikawa, Okazaki (JP); Ryohei Terachi, Toyota (JP)

(72) Inventors: Akira Ichikawa, Okazaki (JP); Ryohei Terachi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 73 days.

(21) Appl. No.: 14/378,774

(22) PCT Filed: Feb. 22, 2013

(86) PCT No.: PCT/IB2013/000451
§ 371 (c)(1),
(2) Date: Aug. 14, 2014

(87) PCT Pub. No.: WO2013/124732
PCT Pub. Date: Aug. 29, 2013

(65) Prior Publication Data
US 2016/0023687 A1   Jan. 28, 2016

(30) Foreign Application Priority Data

Feb. 24, 2012 (JP) ................................. 2012-039227

(51) Int. Cl.
*B62D 25/08* (2006.01)
*B60R 21/34* (2011.01)

(52) U.S. Cl.
CPC ......... *B62D 25/081* (2013.01); *B60R 2021/343* (2013.01)

(58) Field of Classification Search
CPC ....................................................... B62D 25/081
USPC ............................................. 296/192, 187.04
See application file for complete search history.

(56) References Cited

U.S. PATENT DOCUMENTS

| 6,193,304 B1 * | 2/2001 | Takahashi | B60J 1/02 296/187.04 |
| 7,540,557 B2 * | 6/2009 | Shimura | B62D 25/081 296/192 |
| 8,136,870 B2 * | 3/2012 | Ott | B60R 21/34 296/192 |
| 8,651,552 B2 * | 2/2014 | Shibutake | B62D 25/14 296/192 |

FOREIGN PATENT DOCUMENTS

| JP | 11-78978 | 3/1999 |
| JP | 2006-205902 | 8/2006 |
| JP | 2006-264538 | 10/2006 |
| JP | 2009-126480 | 6/2009 |

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A vehicular cowl structure is equipped with a cowl top, a cowl inner panel, and a cowl brace. A part of an upper portion of the cowl brace is protruded forward with respect to a vehicle as a flange portion, and is connected with a front side of the cowl top. Another part of the upper portion of the cowl brace is bent rearward with respect to the vehicle as a flange portion, and is connected with a rear side of the cowl top and an upper portion of the cowl inner panel.

9 Claims, 11 Drawing Sheets

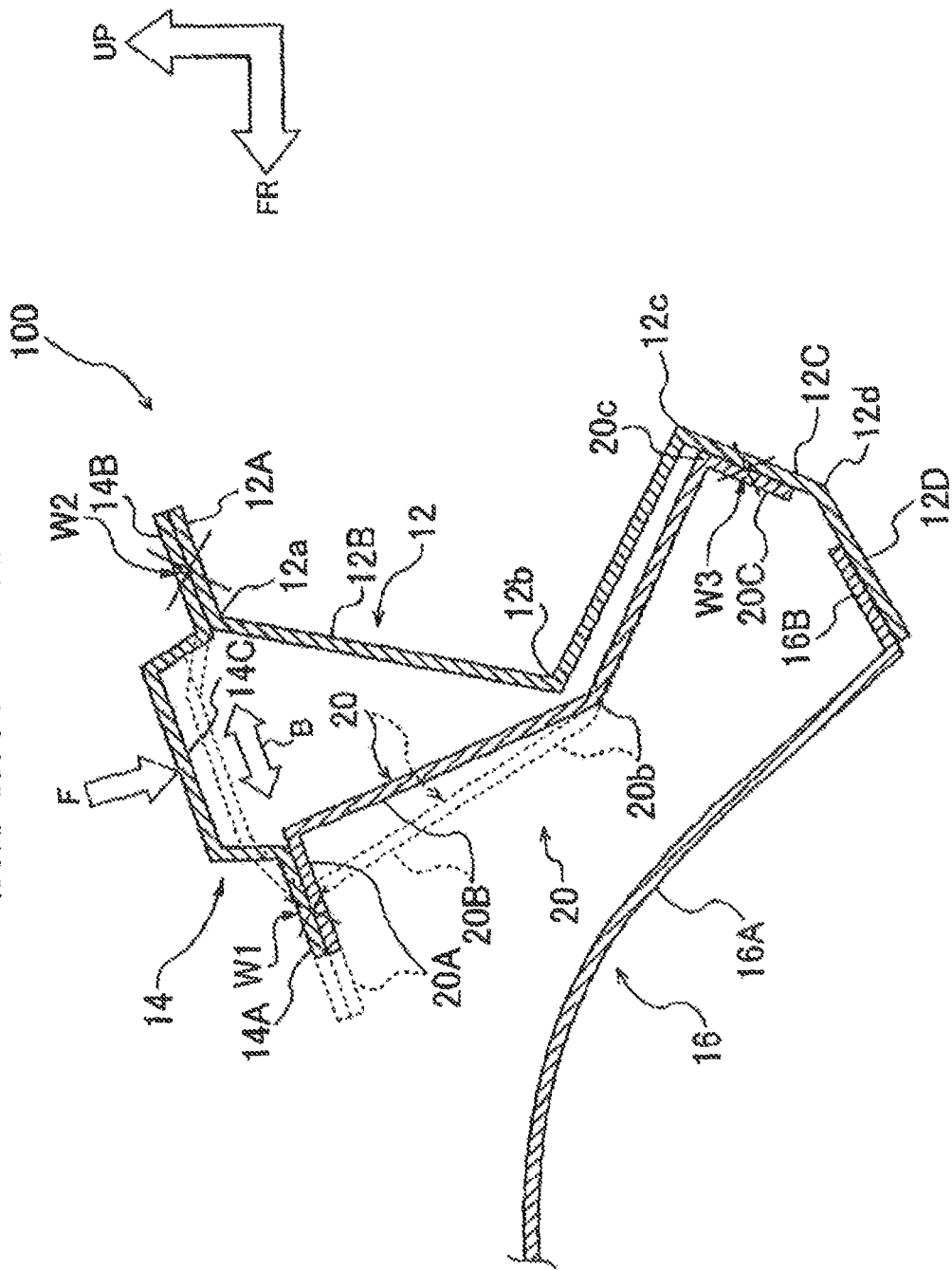

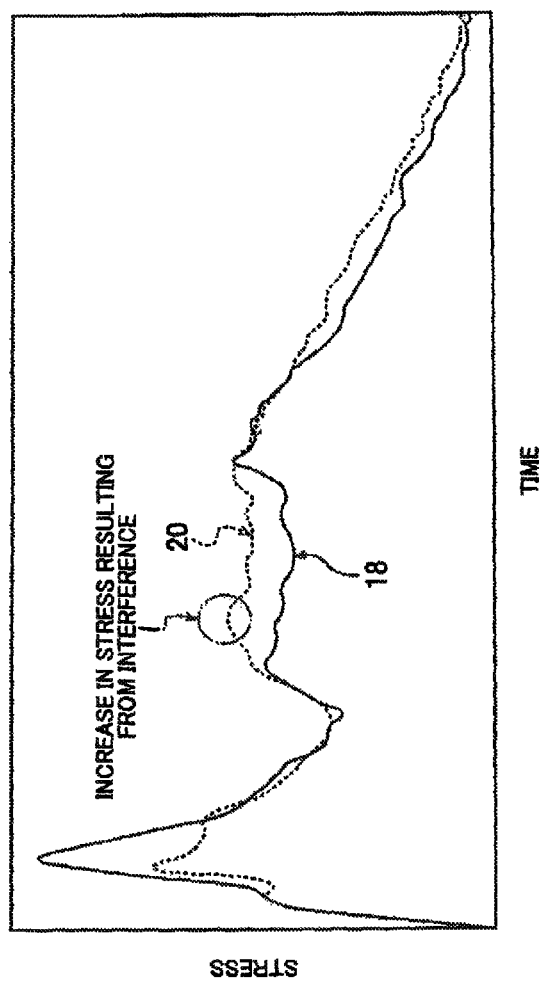

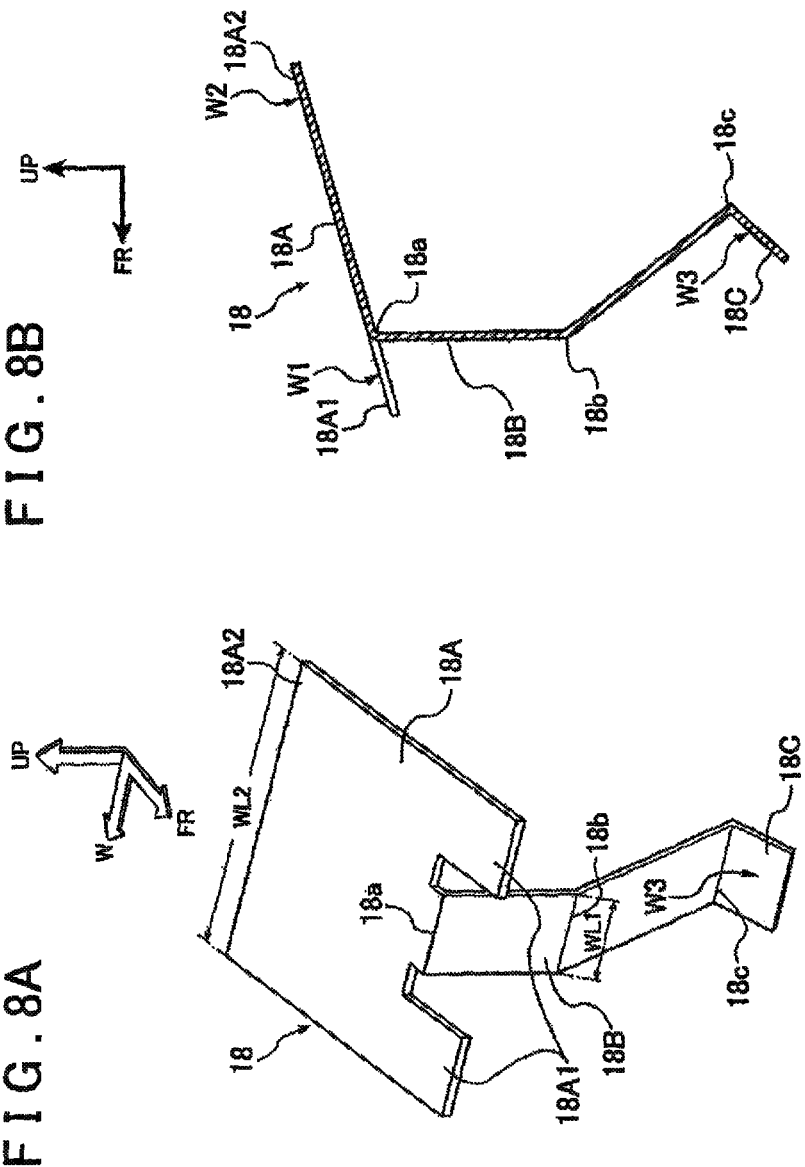

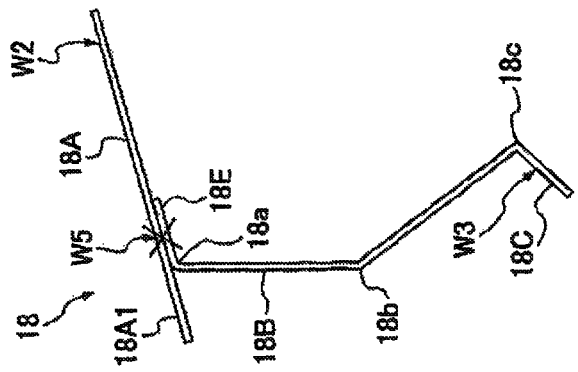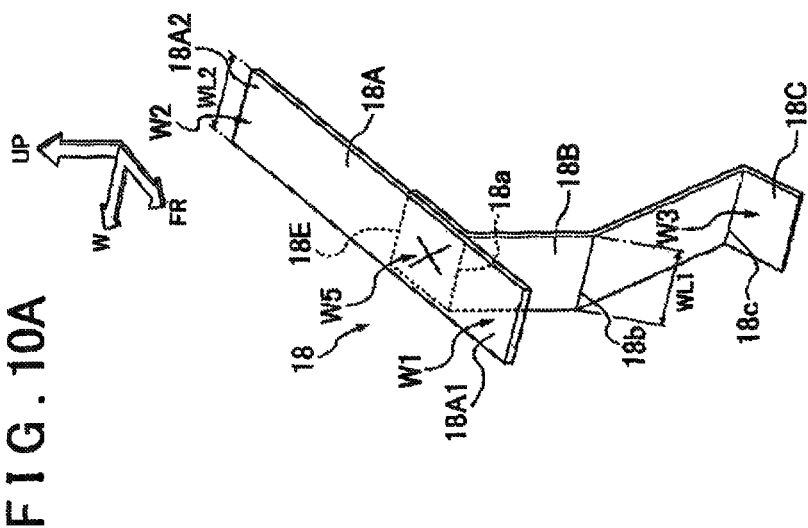

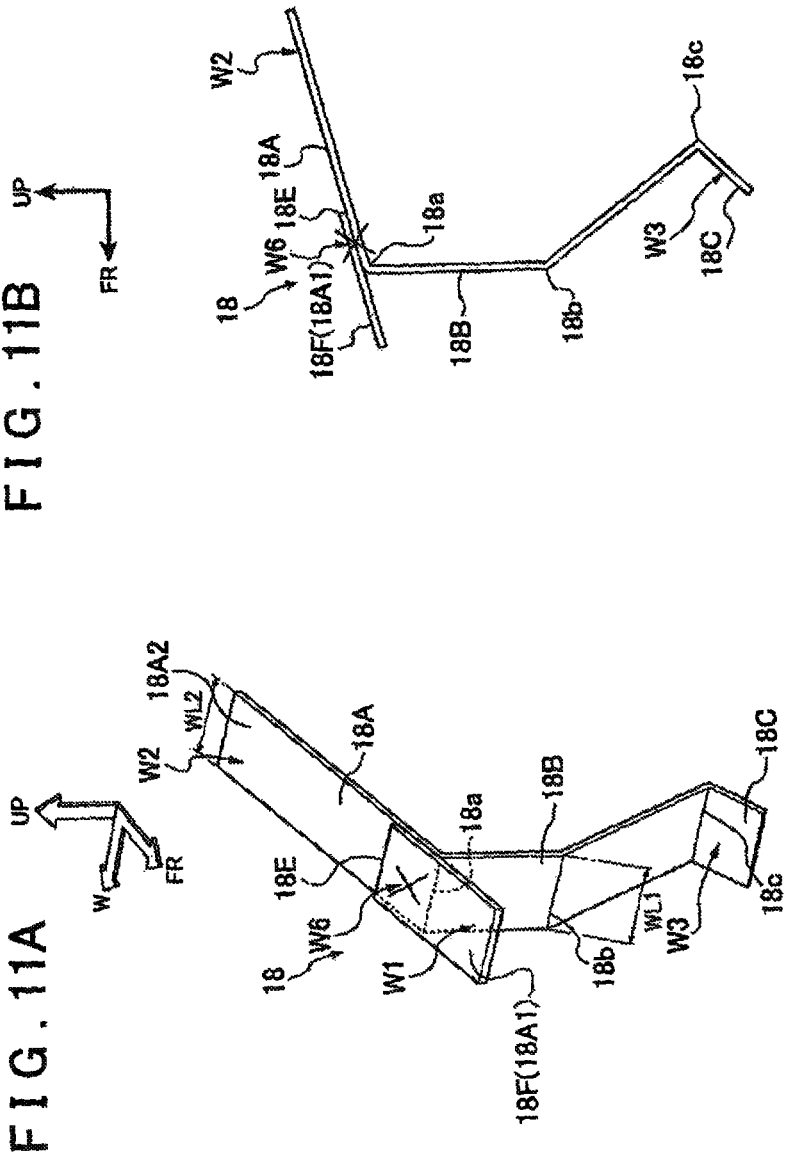

VEHICULAR COWL STRUCTURE

CROSS-REFERENCE TO RELATED APPLICATIONS

This application is a national phase application of International Application No. PCT/IB2013/000451, filed FEB. 22, 2013, and claims the priority of Japanese Application No. 2012-039227, filed Feb. 24, 2012, the content of both of which is incorporated herein by reference.

BACKGROUND OF THE INVENTION

1. Field of the Invention

The invention relates to a vehicular cowl structure that takes noise-and-vibration (NV) performance and pedestrian protection performance into consideration.

2. Description of Related Art

In Japanese Patent Application Publication No. 2006-205902 (JP-2006-205902 A), there is disclosed a vehicular cowl structure. In this vehicular cowl structure, a cowl top (which is referred to also as a cowl outer panel), a cowl inner panel, and a cowl brace (a coupling member) are connected with one another to form a partially closed cross-sectional structure in a vehicle width direction. The cowl top is extended along a lower end of a front windshield glass in the vehicle width direction, and the front windshield glass is supported in the vicinity of the lower end thereof. Besides, the cowl inner panel is extended below the cowl top in the vehicle width direction, and an upper end of the cowl inner panel is connected with a lower end of the cowl top. The cowl brace is configured as a member that is obtained by flexing a band plate-shaped member with a narrow width generally into the shape of N as viewed from beside a vehicle. Also, such cowl braces are set at a plurality of spots in the vehicle width direction.

Flanges obtained by being bent are formed at both lateral portions of the aforementioned cowl brace in the vehicle width direction respectively. Furthermore, fragile portions configured as convex bulge portions are formed at a plurality of spots of each of the flanges in a vertical direction with respect to the vehicle (a position where a bent portion of the cowl brace is set) respectively. Thus, when a collision load is input to the vicinity of the cowl top, the cowl brace is bent at the fragile portions, whereby the energy at the time of the collision is absorbed. As a result, the collision reaction force input to a colliding body is reduced, and an improvement in pedestrian protection performance is achieved.

However, in the aforementioned related art, the generally N-shaped cowl brace is arranged in front of the cowl inner panel with respect to the vehicle. Furthermore, an intermediate portion of each of the cowl inner panel and the cowl brace in the vertical direction with respect to the vehicle is flexed convexly forward with respect to the vehicle. Thus, when a collision load is input to the cowl top from the upper side of the vehicle toward the lower side of the vehicle, the cowl inner panel and the cowl brace may be deformed in such a manner as to approach each other. As a result, the cowl inner panel and the cowl brace may interfere with each other.

SUMMARY OF THE INVENTION

In view of the aforementioned fact, the invention provides a vehicular cowl structure that can effectively restrain or prevent a cowl inner panel and a cowl brace from interfering with each other, and also can make NV performance and pedestrian protection performance compatible with each other.

Thus, according to one aspect of the invention, there is provided a vehicular cowl structure. This vehicular cowl structure is equipped with a cowl top, a cowl inner panel, and a cowl brace. The cowl top is arranged along a lower end of a front windshield glass, and supports the lower end of the front windshield glass. The cowl inner panel is arranged below this cowl top, is arranged with a longitudinal direction of the cowl inner panel coincident with a vehicle width direction, and has, at an intermediate portion of the cowl inner panel in a vehicle height direction, a flexed portion that is protruded forward with respect to the vehicle. The cowl brace is arranged in front of the cowl inner panel with respect to the vehicle, is protruded along the vehicle height direction, has a lower portion of the cowl brace connected with the cowl inner panel, has an intermediate portion flexed in a same direction as the flexed portion, further has a part of an upper portion thereof protruded forward with respect to the vehicle and connected with a front portion of the cowl top, and has another part of the upper portion bent rearward with respect to the vehicle and connected with both a rear portion of the cowl top and an upper portion of the cowl inner panel, accordingly a closed cross-section portion is defined by the cowl brace and the cowl top.

According to the vehicular cowl structure as described above, the cowl top is arranged along the lower end of the front windshield glass, and the cowl inner panel is arranged below the cowl top. The cowl top and the cowl inner panel are coupled to each other by the cowl brace. It should be noted herein that the part of the upper portion of the cowl brace is protruded forward with respect to the vehicle and joined to the front portion of the cowl top, and that the another part of the upper portion is bent rearward with respect to the vehicle and connected with both the rear portion of the cowl top arid the upper portion of the cowl inner panel. Thus, the cowl brace and the cowl inner panel form the closed cross-section portion as viewed from the side of the vehicle. Therefore, the support rigidity of the front windshield glass is enhanced. Accordingly, vibrations caused to the front windshield glass in the vehicle height direction are suppressed. Therefore, the generation of noise such as muffled sound in a vehicle interior or the like is effectively suppressed.

On the other hand, when an impactor collides with the cowl top to compress the cowl inner panel and the cowl brace downward with respect to the vehicle and cause plastic deformation of both the cowl inner panel and the cowl brace, the cowl inner panel is bent in such a manner as to protrude forward with respect to the vehicle from the flexed portion, and the intermediate portion of the cowl brace is bent in the same direction as the cowl inner panel. It should be noted herein that since the another part of the upper portion of the cowl brace is bent rearward with respect to the vehicle, a region from the intermediate portion of the cowl brace to the upper portion of the cowl brace is deformed in such a manner as to protrude in the same manner as the cowl inner panel. Thus, the cowl inner panel and the cowl brace are effectively restrained or prevented from approaching each other, and the cowl inner panel and the cowl brace can be sufficiently deformed in a desired manner. Accordingly, the energy at the time of the collision is sufficiently absorbed, and hence, the collision reaction force input to a colliding body is reduced.

Besides, the part of the upper portion of the cowl brace is protruded forward with respect to the vehicle, and the another part of the upper portion is bent rearward with respect to the vehicle. Accordingly, the cowl brace is formed by a simple structure.

As described above, the vehicular cowl structure has an excellent effect of making it possible to effectively restrain or prevent the cowl inner panel and the cowl brace from interfering with each other and make NV performance and pedestrian protection performance compatible with each other.

Besides, in the vehicular cowl structure, the part of the upper portion of the cowl brace may be partially cut and raised.

According to the vehicular cowl structure as described above, the part of the upper portion of the cowl brace is partially cut and raised. An opening portion is formed through an original section of the cowl brace that has been partially cut and raised, and a fragile portion is formed through the formation of this opening portion. This fragile portion functions as a bending origin. Therefore, a collision load concentrates on this fragile portion to enable sufficient bending deformation. When the collision load is input to the vicinity of the cowl top to compress the cowl inner panel and the cowl brace downward with respect to the vehicle and cause plastic deformation of both the cowl inner panel and the cowl brace, the cowl brace is bent from the intermediate portion and also from the fragile portion. Furthermore, he fragile portion is bent in such a manner as to protrude forward with respect to the vehicle toward the partially cut and raised part of the upper portion of the cowl brace. It should be noted herein that since the flexed portion of the cowl inner panel and the intermediate and fragile portions of the cowl brace are bent in the same direction, the cowl inner panel and the cowl brace are restrained from approaching each other, and the cowl inner panel and the cowl brace can be sufficiently bent to be deformed in a desired manner. Thus, the energy at the time of the collision is sufficiently absorbed, and hence, the collision reaction force applied to the colliding body is reduced.

Besides, the fragile portion is formed by partially cutting and raising the part of the upper portion of the cowl brace. Therefore, the fragile portion can be easily manufactured.

As described, above, the vehicular cowl structure has an excellent effect of making it possible to effectively restrain or prevent the cowl inner panel and the cowl brace from interfering with each other and further improve pedestrian protection performance.

It should be noted herein that in the vehicular cowl structure, the part of the upper portion of the cowl brace may also have a flange portion that is located at a central portion of the cowl brace in the vehicle width direction. Furthermore, the part of the upper portion of the cowl brace may also have a pair of flange portions that are located on both sides of the cowl brace respectively in the vehicle width direction.

Besides, in the vehicular cowl structure, the cowl brace may also include the upper portion of the cowl brace, a lower portion of the cowl brace, and a cowl brace body that is located between the upper portion of the cowl brace and the lower portion of the cowl brace, and the upper portion of the cowl brace may also have a larger width dimension in the vehicle width direction than the cowl brace body.

Besides, in the vehicular cowl structure, the cowl brace may also include the upper portion of the cowl brace, a lower portion of the cowl brace, and a cowl brace body that is located between the upper portion of the cowl brace and the lower portion of the cowl brace, and the upper portion of the cowl brace may also have a substantially same width dimension in the vehicle width direction as the cowl brace body. Furthermore, the upper portion of the cowl brace may also be formed as a member separate from the cowl brace body.

Besides, in the vehicular cowl structure, the cowl top may also have an intermediate portion in a vehicle longitudinal direction as viewed from the side of the vehicle, the intermediate portion being formed in a cross-sectional shape of a hat that is protruded upward in the vehicle height direction. A front flange portion of the cowl top may also be connected with the part of the upper portion of the cowl brace, and a rear flange portion of the cowl top may also be connected with the another part of the upper portion of the cowl brace, so that another closed cross-section portion is defined by the cowl top and the upper portion of the cowl brace.

According to the vehicular cowl structure as described above, the cowl top is formed in the cross-sectional shape of the hat as viewed from the side of the vehicle. It should be noted herein that the part of the upper portion of the cowl brace is connected with the front flange portion of the cowl top, and that the another part of the upper portion of the cowl brace is connected with the rear flange portion of the cowl top. Thus, the another closed cross-section portion is defined by the cowl top and the upper portion of the cowl brace as viewed from the side of the vehicle. Therefore, the cross-sectional shape of the cowl top is maintained, and the cowl inner panel and the cowl brace can be effectively restrained or prevented from approaching each other. Accordingly, the support rigidity of the front windshield glass is enhanced.

Besides, the part of the upper portion of the cowl brace is more protruded toward the front flange portion than the protruded region of the cowl top. Therefore, the part of the upper portion of the cowl brace and the front flange portion of the cowl top are connected with each other on the vehicle front side. Thus, the operation of connecting the cowl inner panel and the cowl brace with each other can be easily performed.

As described above, the vehicular cowl structure has an excellent effect of making it possible to further improve NV performance and enhance productivity.

Besides, in the vehicular cowl structure, the part of the upper portion of the cowl brace may also be formed by partially cutting and raising a central portion of the upper portion in the vehicle width direction, the part of the upper portion and the front flange portion may also be connected with each other at one spot, and the another part of the upper portion and the rear flange portion may also be connected with each other at two spots in the vehicle width direction.

Besides, according to the vehicular cowl structure as described above, the part of the upper portion of the cowl brace is partially cut and raised at the central portion of the upper portion in the vehicle width direction. This part of the upper portion and the front flange portion are connected with each other at one spot, and the another part of the upper portion and the rear flange portion are connected with each other at two spots in the vehicle width direction. Thus, the cowl top and the cowl brace are connected with each other at the three spots. Therefore, the state in which the cowl brace and the cowl top are connected with each other can be stabilized.

As described above, the vehicular cowl structure has an excellent effect of making it possible to effectively restrain or prevent the cowl inner panel and the cowl brace from interfering with each other and further improve NV performance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a cross-sectional view of the vehicular cowl structure according to the comparative example before and after a force is input to the vicinity of a cowl top thereof (a cross-sectional view of the cowl brace taken along a line extending in the vertical direction with respect to the vehicle);

FIG. 7 is a graph showing changes in stress of the cowl brace with the passage of time after a collision in the vehicular cowl structure according to the first embodiment of the invention and the vehicular cowl structure according to the comparative example;

FIG. 8A is a perspective view of a cowl brace of a vehicular cowl structure according to the second embodiment of the invention;

FIG. 8B is a cross-sectional view of the cowl brace shown in FIG. 8A as viewed from beside a vehicle;

FIG. 10A is a perspective view of a cowl brace of a vehicular cowl structure according to the third embodiment of the invention;

FIG. 10B is a lateral view of the cowl brace shown in FIG. 10A as viewed from beside a vehicle;

FIG. 11A is a perspective view of a cowl brace of a vehicular cowl structure according to a modification example of the third embodiment of the invention; and FIG. 11B is a lateral view of the cowl brace shown in FIG. 11A as viewed from beside a vehicle.

DETAILED DESCRIPTION OF EMBODIMENTS

Figure 1:
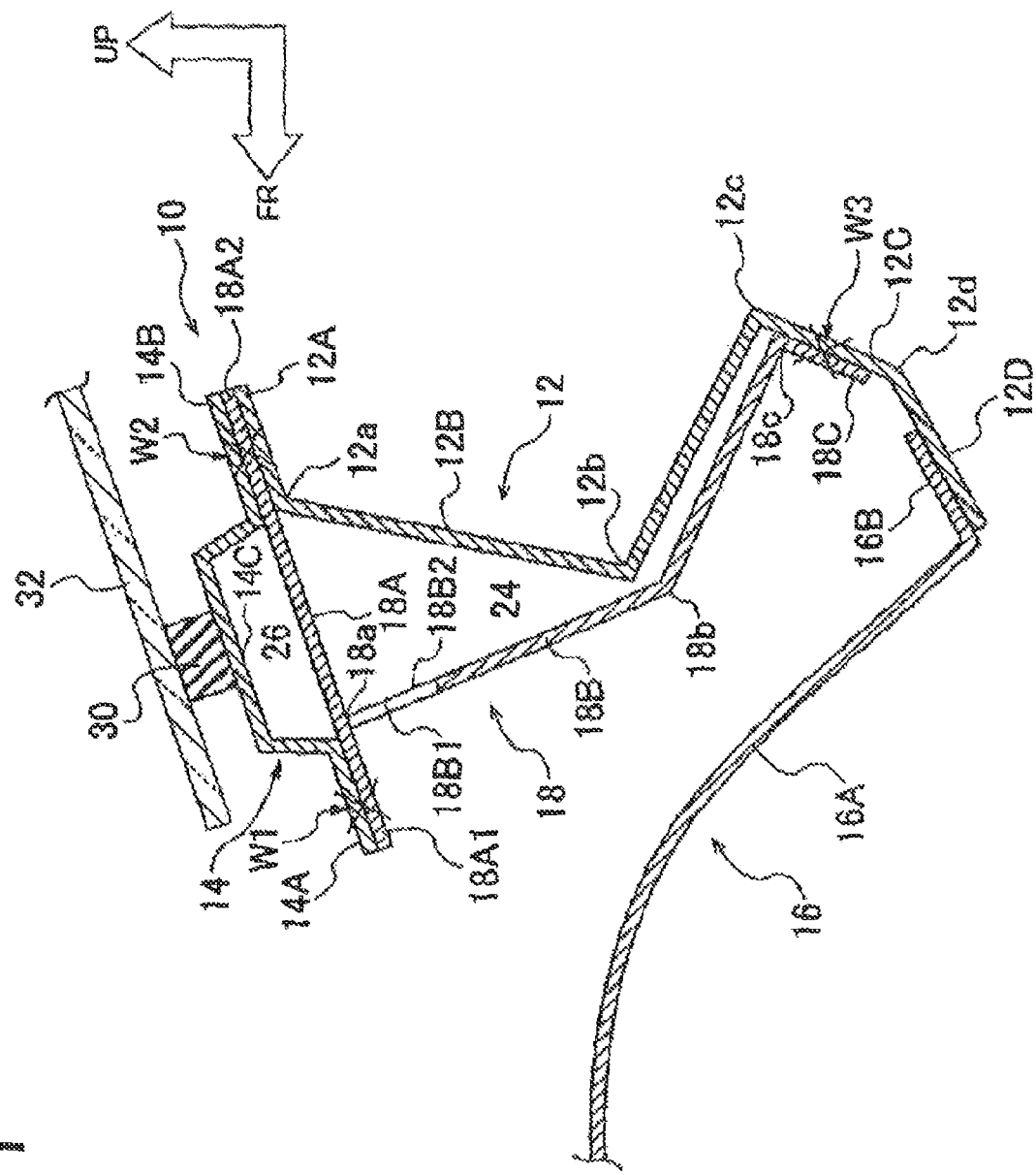
FIG. 1 is a cross-sectional view of a vehicular cowl structure according to the first embodiment of the invention as viewed from beside a vehicle (a cross-sectional view of the vehicular cowl structure taken along a line F1-F1 passing through a cowl brace shown in FIG. 2)

The embodiments of a vehicular cowl structure according to the invention will be described hereinafter using the drawings. Incidentally, arrows FR shown as needed in the drawings indicate a forward direction with respect to a vehicle, arrows UP shown as needed in the drawings indicate an upward in the vehicle height direction, and arrows W shown as needed in the drawings indicate a width direction with respect to the vehicle.

Figure 2:
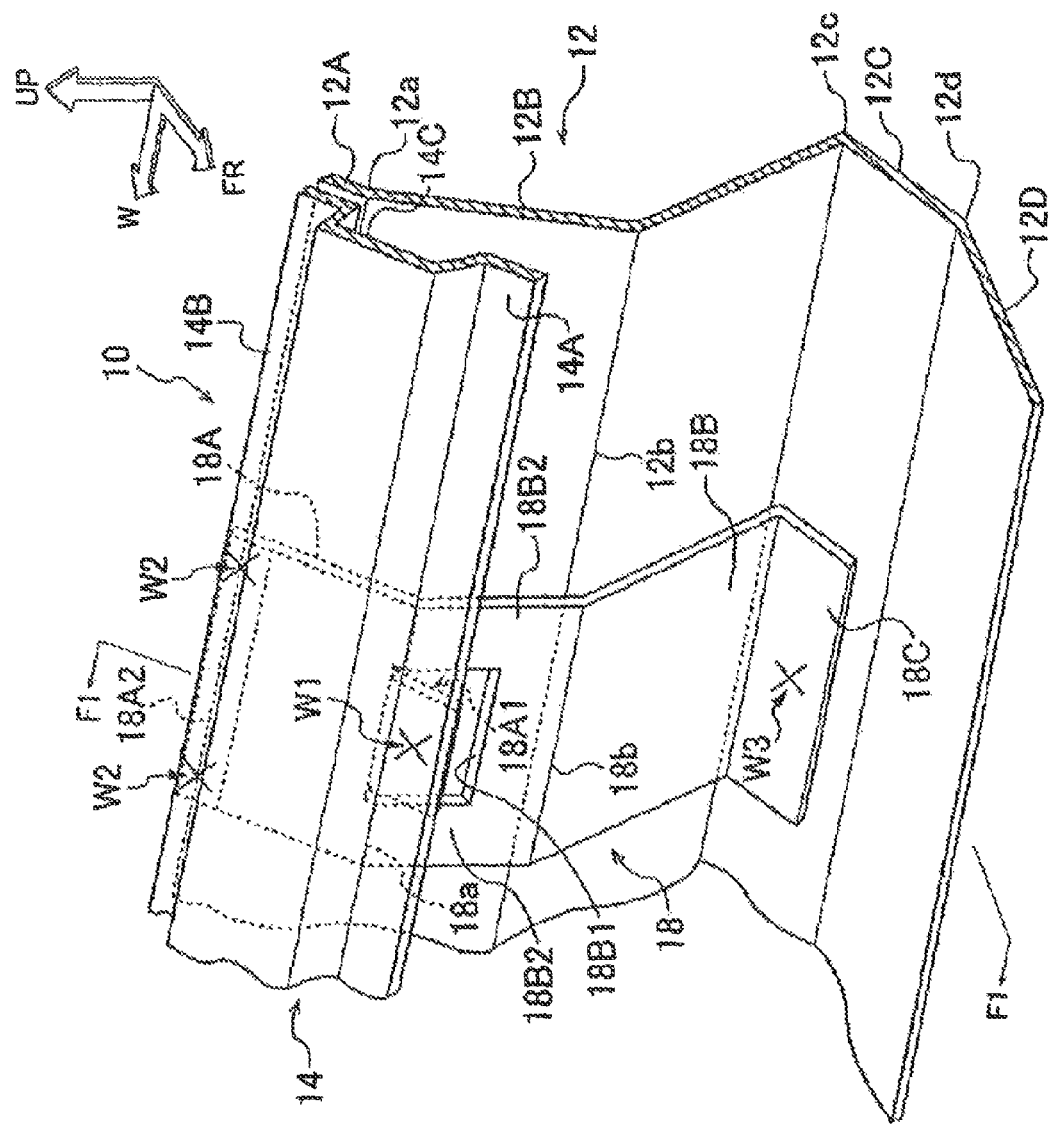
FIG. 2 is a perspective view of the vehicular cowl structure shown in FIG. 1 as viewed diagonally from a vehicle front side toward a vehicle rear side.
Figure 3:
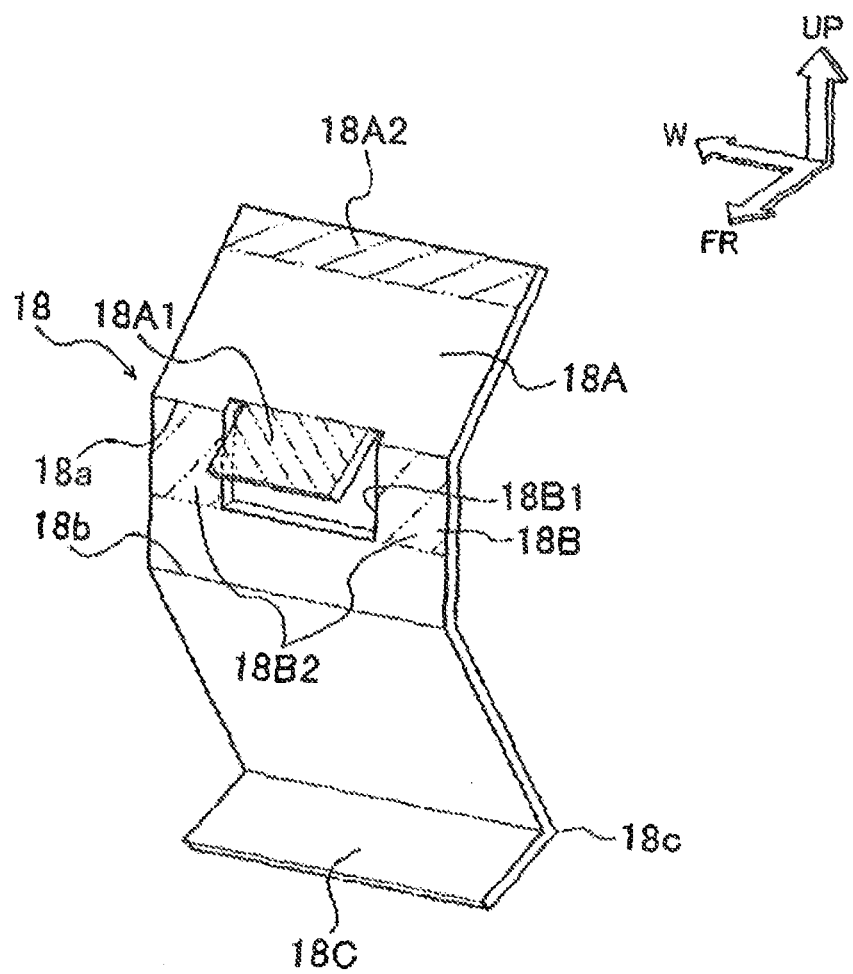
FIG. 3 is a perspective view of the cowl brace of the vehicular cowl structure shown in FIG. 2.

First of all, the overall configuration of the vehicular cowl structure will be described. As shown in FIGS. 1 to 3, a vehicular cowl structure 10 according to the first embodiment of the invention is mainly constituted of a cowl top (which is referred to also as a cowl top outer) 14, a cowl inner panel 12, and a cowl brace 18. These components will be described hereinafter in this order.

As shown in FIGS. 1 and 2, the cowl top 14 is arranged along a lower end of a front windshield glass 32, with a longitudinal direction of the cowl top 14 coincident with the vehicle width direction. Besides, the cowl top 14 generally has a cross-sectional shape of a hat, with an intermediate portion in the vehicle longitudinal direction protruded upward in the vehicle height as viewed from the side of the vehicle. More specifically, the cowl top 14 is equipped with a front flange portion 14A, a rear flange portion 14B, and an intermediate portion 14C. The front flange portion 14A and the rear flange portion 14B are extended in such a direction as to move away from each other in the vehicle longitudinal direction. The intermediate portion 14C ties up this front flange portion 14A and this rear flange portion 14B with each other. The vicinity of a lower end of the front windshield glass 32 is fixed to the intermediate portion 14C by an adhesive 30.

The cowl inner panel 12 is arranged below the cowl top 14 with respect to the vehicle, with a longitudinal direction of the cowl inner panel 12 coincident with the vehicle width direction. Besides, the cowl inner panel 12 is extended in the vertical direction with respect to the vehicle, and constitutes a rear wall portion of the cowl. Structurally, an upper end of the cowl inner panel 12 is bent rearward with respect to the vehicle to become an upper flange portion 12A. This upper flange portion 12A is connected with: the rear flange portion 14B of the cowl top 14 through spot welding (or laser welding) (see welding spots W2). Incidentally, welding spots are denoted by "×" in FIG. 1 and the like.

A cowl inner panel body 12B that is formed in the shape of a sign "<" as viewed from beside the vehicle is arranged below a front end of the aforementioned upper flange portion 12A with respect to the vehicle. A downward inclined portion 12C is extended from a lower end of this cowl inner panel body 12B downward and forward with respect to the vehicle. Furthermore, a lower flange portion 12D is extended from a lower end of the downward inclined portion 12C forward with respect to the vehicle. Incidentally, a connection region between the upper flange portion 12A and the cowl inner panel body 12B is a flexed portion 12a. Besides, a flexed region at an intermediate portion of the cowl inner panel body 12B in a height direction thereof is a flexed portion 12b. A connection region between the cowl inner panel body 12B and the downward inclined portion 12C is a flexed portion 12c. Furthermore, a connection region between the downward inclined portion 12C and the-lower flange portion 12D is a flexed portion 12d.

As shown in FIG. 1, a cowl lower panel 16 is arranged below the cowl top 14 with respect to the vehicle and in front of the cowl inner panel 12 with respect to the vehicle. A bowl lower panel body 16A of the cowl lover panel 16 is extended from the vehicle front side to the vehicle rear side, and a bulge that protrudes upward in the vehicle height is formed on the cowl lower panel body 16A. A lower end of the cowl lower panel 16 is a flange portion 16B that is bent along the lower flange portion 12D of the cowl inner panel 12 rearward with respect to the vehicle. This flange portion 46B is connected with the lower flange portion 12D by an adhesive.

Next, the configuration of the cowl brace will be described. As shown in FIGS. 1 to 3, the cowl brace 18 is extended in the vertical direction with respect to the vehicle at a predetermined position in the vehicle width direction. The cowl top 14 and the cowl inner panel 12 are coupled to each other by this cowl brace 18. That is, the front windshield glass 32 is supported by the cowl inner panel 12 and the cowl brace 18 via the cowl top 14. In this embodiment of the invention, the single cowl brace 18 is disposed:, at the central portion in the vehicle width direction, but it is not absolutely required that there be only one cowl brace. Two or more cowl braces 18 may be disposed at predetermined intervals in the vehicle width direction.

A flange portion 18A1 that is protruded forward with respect to the vehicle by being partially cut and raised forward with respect to the vehicle is formed on a part of an upper portion 18A of the cowl brace 18. This flange portion 18A1 is an example of "the part of the upper portion" according to the invention. The flange portion 18A1 is joined with the front flange portion 14A of the cowl top 14 through spot welding or the like (see a welding spot W1). In this embodiment of the invention, there is only one welding spot W1. The flange portion 18A1 is arranged in such a range as to overlap with the front flange portion 14A of the cowl top 14 as viewed on the plane of the vehicle, and is partially cut and raised substantially parallel to the front flange portion 14A. A cowl brace body 18B is extended from a rear end of the flange portion 18A1 downward with respect to the vehicle, and the flange portion 18A1 is formed by partially cutting and raising a part of a central portion of the cowl brace body 18B in the width direction. An opening 18B1 is formed through an original region of the cowl brace body 18B where the flange portion 18A1 has been partially cut and raised. Thus, the total length of the cowl brace body 18B in the vehicle width direction (the substantial width dimension of the cowl brace body 18B except the opening 18B1) is made shorter Than the length of the other regions. A fragile portion 18B2 that has lower rigidity than the other regions is formed on the cowl brace body 18B. The opening 18B1 is formed at a central portion of the cowl inner panel body 12B in the height direction thereof, and is arranged above the flexed portion 12b, which is flexed in the same direction as the flexed portion 18b, with respect to the vehicle. It should be noted herein that the expression "the same direction" is used to mean the forward direction with respect to the vehicle, and therefore includes both the perfectly same direction and the substantially same direction.

It should be noted herein that the expression "cutting and raising" is used to mean that the part of the upper portion of the cowl brace 18 is cut off through a cutting process to form the contour of the flange portion 18A1, and that this flange portion 18A1 is raised from the cowl brace body 18B forward with respect to the vehicle. In this embodiment of the invention, this flange portion 18A1 is cut and raised while the flange portion A2 is bent rearward with respect to the vehicle. A front face of the flange portion 18A1 that is located on the upper side with respect to the vehicle (or a back face of the flange portion 18A1 that is located on the lower side with respect to the vehicle) is set substantially flush with a front face of the flange portion 18A2 that is located on the upper side with respect to the vehicle (or a back face of the flange portion 18A2 that is located on the lower side with respect to the vehicle). In other words, the bending angle of the flange portion 18A1 from the cowl brace body 18B is set substantially equal to the bending angle of the flange portion 18A2 from the cowl brace body 18B. The cutting process adopted in manufacturing the cowl brace. 18 includes, for example, a punching process, a laser cutting process, a high hydrostatic pressure cutting process, and the like.

In this embodiment of the invention, the flange portion 18A1 is formed in a rectangular shape in a plan view. Incidentally, the shape of the flange portion 18A1 is not limited to this shape. Any one of a trapezoidal shape, a triangular shape, a polygonal shape with five or more angles, a semicircular shape, a semielliptic shape and the like may be adopted as the shape of the flange portion 18A1.

Apart from the flange portion 18A1, the flange portion 18A2, which is bent from the cowl brace 18B rearward with respect to the vehicle with the flexed portion 18a serving as a bending origin and is protruded rearward with respect to the vehicle, is formed on another part of the upper portion of the cowl brace 18. This flange portion 18A2 is an example of "the another part of the upper portion" according to the invention. The flange portion 18A2 is extended to such a range as to overlap with the rear flange portion 14B of the cowl top 14 as viewed on the plane of the vehicle, and is connected with this rear flange portion 14B through spot welding or the like. The flange portion 18A2 is interposed between the rear flange portion 14B and the upper flange portion 12A of the cowl inner panel 12, and is liked with the rear flange portion 14B and the upper flange portion 12A at the welding spots W2 in a triply overlapping manner. As shown in FIG. 2, in this case, there are two welding spots W2 in the vehicle width, direction. The single welding spot 1 and the two welding spots W2 are ideally set at positions corresponding to apexes of a triangle as viewed on the plane of the vehicle. This triangular shape obtained by joining the respective apexes with one another is preferably set as the shape of an equilateral triangle or an isosceles triangle. Thus, the strength of connected the cowl top 14 and the cowl brace 18 with each other is enhanced. It should be noted herein that the cowl top 14 is connected with the flange portions 18A1 and 18A2 of the cowl brace 18 as shown in FIG. 1, whereby a closed cross-section portion (an upper closed cross-section portion) 26 is formed as viewed from the side of the vehicle.

A flange portion 18C that is bent forward and downward with respect to the vehicle is formed at a lower end of the cowl brace body 18B. The flange portion 18C is bent along the lower flange portion 12C of the cowl inner panel 12, and is connected with the flange portion 12C through spot welding or the like (see a welding spot W3). Besides, a flexed portion 18c is formed between the cowl brace body 18B and the flange portion 18c.

Next, the operation and effect of this embodiment of the invention will be described. In the vehicular cowl structure 10 according to the foregoing first embodiment of the invention, the part of the upper portion of the cowl brace 18 is formed as the flange portion 18A1 that is protruded forward with respect to the vehicle. This flange portion 18A1 is joined to the front flange portion 14A of the cowl top 14. The another part of the upper portion of the cowl brace 18 is formed as the flange portion 18A2 that is bent rearward with respect to the vehicle and protruded. This flange portion 18A2 is joined to the rear flange portion 14B of the cowl top 14 and the upper flange portion 12A of the cowl inner panel 12. Thus, as shown in FIG. 1, a closed cross-section portion (a lower closed cross-section portion) 24 is formed by the cowl brace 18, the flange portion 18A2 thereof, and the cowl inner panel 12 as viewed from beside the vehicle. Therefore, the support rigidity of the front windshield glass 32 is enhanced. Accordingly, vibrations are restrained from being caused to the front windshield glass 32 in the vertical direction with respect to the vehicle. Therefore, the generation of noise such as muffled sound in the vehicle interior or the like is suppressed.

Figure 4:
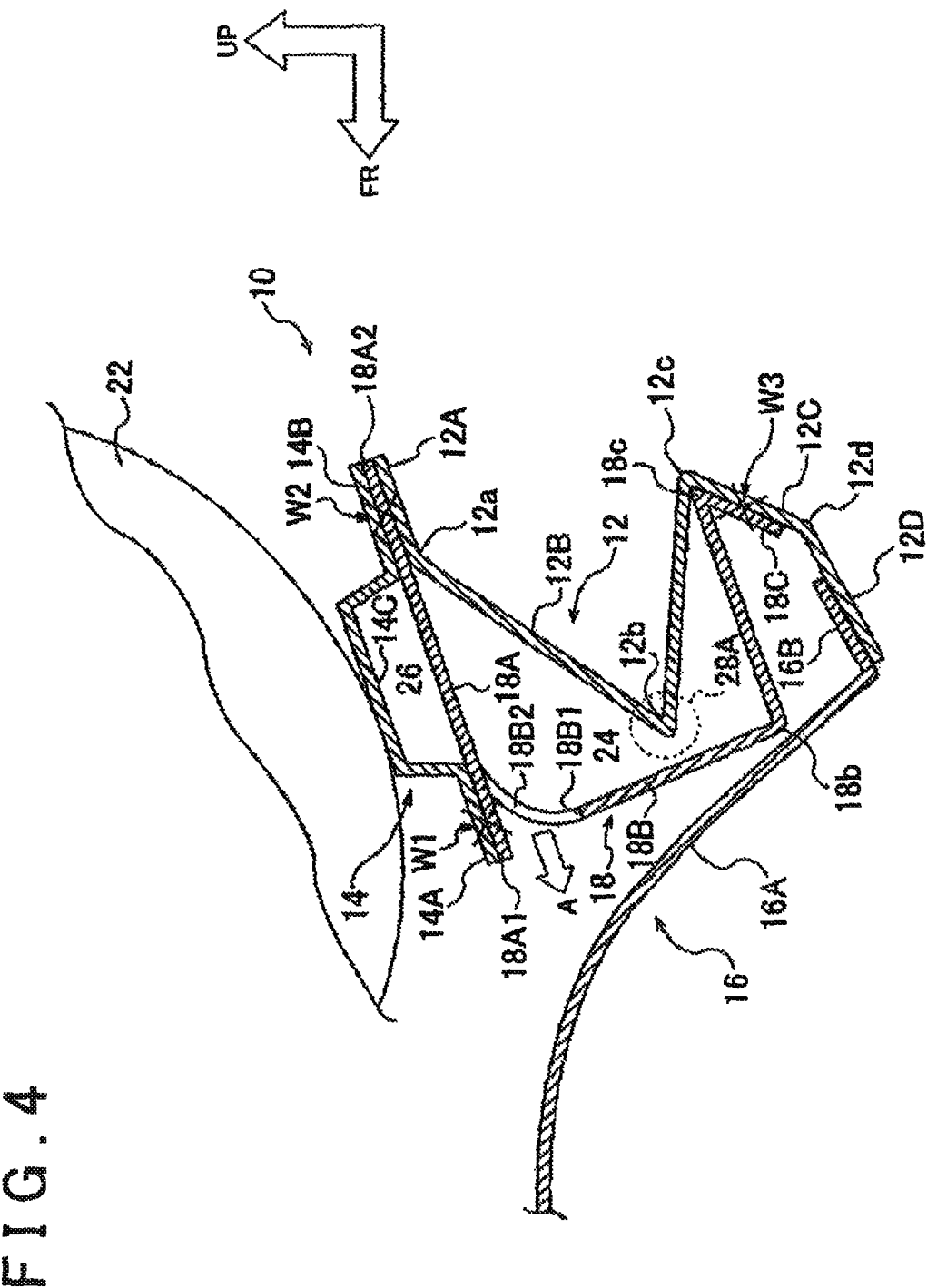
FIG. 4 is a cross-sectional view of the vehicular cowl structure shown in FIG. 1 after a collision.

On the other hand, the flange portion 18A1 is formed by partially cutting and raising the part of the upper portion of the cowl brace 18. The original region of the cowl brace 18 that has been partially cut and raised is formed as a partially removed fragile portion 18B2 (through which an opening portion 18B1 is formed). The fragile portion 18B2 functions as a bending origin. Therefore, a collision load concentrates at this fragile portion 18B2, thus enabling sufficient bending deformation. Besides, the flange portion 18A2 of the cowl brace 18 is formed by being bent rearward with respect to the vehicle. Thus, as shown in FIG. 4, when an impactor 22 collides with the cowl top 14 to compress the cowl inner panel 12 and the cowl brace 18 downward with respect to the vehicle and, hence cause plastic deformation of the cowl inner panel 12 and the cowl brace 18, the cowl brace 18 is bent from the flexed portion 18*b* thereof. Besides, the cowl brace 18 is bent from the fragile portion 18B2 thereof as well. At this fragile portion 18B2, the flange portion 18A2 is bent rearward with respect to the vehicle. Therefore, the cowl brace 18 is bent toward the flange portion 18A1 in such a manner as to protrude forward with respect to the vehicle (in a direction indicated by an arrow A shown in FIG. 4). On the other hand, the cowl inner panel 12 is bent from the flexed portion 12*b* in such a manner as to protrude forward with respect to the vehicle. In consequence, the cowl inner panel 12, the cowl brace 18, and the fragile portion 18B2 of this cowl brace 18 are all bent in the same direction, namely, forward with respect to the vehicle. Therefore, a spacing distance is ensured between the cowl inner panel 12 and the cowl brace 18, and the cowl inner panel 12 and the cowl brace 18 are effectively restrained or prevented from approaching each other. For example, the cowl inner panel 12 and the cowl brace 18 can be sufficiently bent to be deformed without interfering with each other (without coming into contact with each other). In particular, a deformed region of the flexed portion 12*b* of the cowl inner panel 12 (a region denoted by a reference symbol 28A and surrounded by a broken line in FIG. 4) is effectively restrained or prevented from coming into contact with the cowl brace body 18B.

Figure 5:
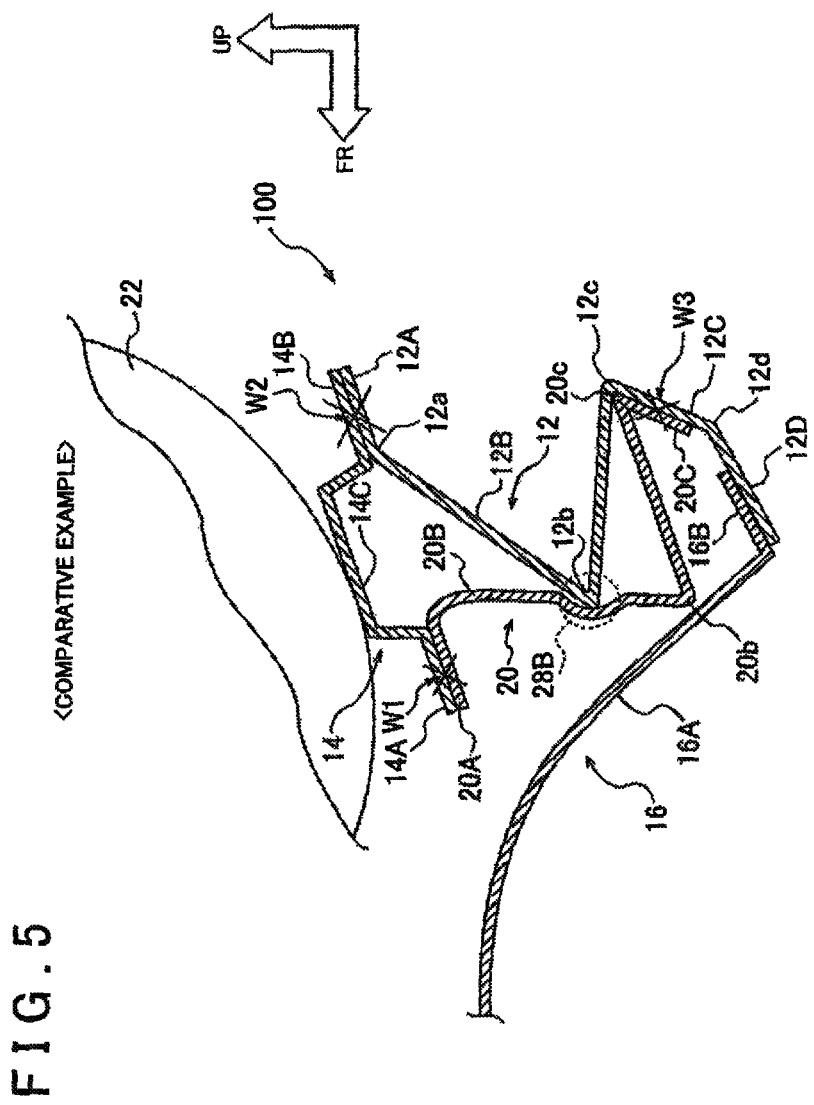
FIG. 5 is a cross-sectional view of a vehicular cowl structure according to a comparative example of the first embodiment of the invention after a collision (a cross-sectional view of a cowl brace taken along a line extending in a vertical direction with respect to a vehicle)

FIG. 5 shows a vehicular cowl structure 100 according to a comparative example. In the vehicular cowl structure 100 according to this comparative example, the basic configuration of the cowl top 14 and the cowl inner panel 12 is the same as in the vehicular cowl structure 10 according to the first embodiment of the invention, but a cowl brace 20 that is different from the cowl brace 18 according to the first embodiment of the invention is employed. A flange portion 20A that is bent from a cowl brace body 20B forward with respect to the vehicle is formed on an upper portion side of this cowl brace 20. The flange portion 20A is connected with the front flange portion 14A of the cowl top 14. A flange portion 20C that is bent from the cowl brace body 20B downward and forward with respect to the vehicle is formed on a lower portion side of the cowl brace 20. The flange portion 20C is connected with the flange portion 12C of the cowl inner panel 12. A flexed portion 20*c* is formed between the cowl brace body 20B and the flange portion 20C. Besides, a flexed portion 20*b* that is protruded forward with respect to the vehicle is formed at an intermediate portion of the cowl brace body 20B in the vertical direction with respect to the vehicle.

As shown in FIG. 5, in the vehicular cowl structure 100 according to the comparative example, when the impactor 22 collides with the cowl top 14 to compress the cowl inner panel 12 and the cowl brace 20 downward with respect to the vehicle, the cowl inner panel 12 and the cowl brace 20 are plastically deformed. At this moment, the cowl brace 20 is bent from the flexed portion 20*b* thereof, and the cowl inner panel 12 is bent from the flexed portion 12*b* thereof. Thus, the cowl brace body 2013 and the cowl inner panel body 12B are plastically deformed in such a manner as to approach each other. Accordingly, if the flexed portion. 12*b* of the cowl inner panel 12 and the cowl brace 20 interfere with each other during plastic deformation, the cowl brace body 20B and the cowl inner panel body 12B are hindered from being plastically deformed. In FIG. 5, an interference range is denoted by the reference symbol 28B.

As indicated by a broken line in FIG. 7, in the vehicular cowl structure 100 according to the foregoing comparative example, immediately after the impactor 22 collides with the cowl top 14, the stress that results from a collision load against the support rigidity of the cowl brace 20 and the cowl top 14 has increased. After that, when the cowl brace 20 and the cowl inner panel 12 are bent from the flexed portions 20*b* and 12B thereof or the like, the stress tends to be reduced, in the case where the cowl inner panel 12 has interfered with the cowl brace body 20B after the lapse of a certain time since the collision, initial (targeted) sufficient bending is not obtained, and the energy at the time of the collision is not sufficiently absorbed. Therefore, the stress increases.

In contrast, in the vehicular cowl structure 10 according to this embodiment of the invention, the cowl inner panel 12 is restrained from approaching the cowl brace 18 after the lapse of a certain time since a collision of the impactor 22. In consequence, the cowl brace 18 and the cowl inner panel 12 are effectively restrained or prevented from interfering with each other. Thus, the cowl brace 18 and the cowl inner panel 12 are not hindered from being plastically deformed (bent), and the energy at the time of the collision is sufficiently absorbed. Therefore, the stress is reduced as shown in FIG. 7. That is, the collision reaction force applied to the colliding body (the impactor 22) is reduced.

Besides, in the vehicular cowl structure 10 according to this embodiment of the invention, the fragile portion 18B2 of the cowl brace 18 is formed by partially cutting and raising the upper portion side of the cowl brace, 18 (the part of the flexed portion 18*a* side between the flexed portion 18*a* and the flexed portion 18*b*). Therefore, the fragile portion 18B2 can be easily manufactured. Furthermore, in the vehicular cowl structure 10 according to this embodiment of the invention, the flange portion 18A2 of the cowl brace 18 is simply bent from the cowl brace body 18B rearward with respect to the vehicle. Therefore, the flange portion 18A2 can also be easily manufactured. Accordingly, the vehicular cowl structure 10 according to this embodiment of the invention makes it possible to effectively restrain or prevent the cowl inner panel 12 and the cowl brace 18 from interfering with each other, and make NV performance and pedestrian protection performance compatible with each other.

Besides, in the vehicular cowl structure 10 according to this embodiment of the invention, as shown in FIGS. 1 and 2, the closed cross-section portion (the upper closed cross-section portion) 26 is formed with the opening of the cowl top 14 on the lower side of the vehicle blocked up as viewed from the side of the vehicle. Therefore, the support rigidity of the front windshield glass 32 is enhanced, NV performance is further improved, and productivity is further enhanced.

Still, FIG. 6 shows a deformed state of the vehicular cowl structure 100 according to the foregoing comparative example (see FIG. 5) before and after a force is input to the vicinity of the cowl top 14 thereof. However, the cowl top 14 has a cross-sectional shape of a hat as viewed from beside the vehicle, but has an opening on the lower side of the vehicle. The cowl top 14 is not formed as a closed cross-section portion. Thus, as indicated by an arrow B in FIG. 6, for example, when a force F applied from the front windshield glass 32 downward with respect to the vehicle is input to the vicinity of the cowl top 14, the cowl top 14 is deformed in a spreading manner such that the front flange portion 14A and the rear flange portion 14B are deformed forward and rearward with respect to the vehicle respectively in such a manner as to move away from each other. Thus, the support rigidity of the front windshield glass 32 by the cowl top 14 decreases.

In contrast, in the vehicular cowl structure 10 according to this embodiment of the invention, as described above, the cowl top 14 is designed as a closed cross-section. Therefore, the cowl top 14 is effectively restrained or prevented from being deformed in the vehicle longitudinal direction in an opening manner, and the support rigidity of the front windshield glass 32 is enhanced.

Besides, in the vehicular bowl structure 10 according to this embodiment of the invention, the flange portion 18A1 of the cowl brace 18 is extended more forward with respect to the vehicle to the front flange portion 14A than the intermediate portion 14C of the cowl top 14. It should be noted herein that the flange portion 18A1 and the front flange portion 14A are overlapped with each other in the vertical direction with respect to the vehicle, and are connected with each other with the aid of for example, welding. Thus, the operation of connecting the flange portion 18A1 and the front flange portion 14A with each other can be performed as a welding operation on the front side with respect to the vehicle, more specifically, on the front side with respect to the vehicle and in the vertical direction with respect to the vehicle. Therefore, the operation of connecting the cowl top 14 and the cowl brace 18 with each other can be easily performed. Accordingly, the vehicular cowl structure 10 according to this embodiment of the invention achieves a further improvement in NV performance and the enhancement of productivity.

Furthermore, in the vehicular cowl structure 10 according to this embodiment of the invention, the flange portion 18A1 is formed by partially cutting and raising the central portion of the cowl brace body 18B in the vehicle width direction. This flange portion 18A1 and the front flange portion 14A of the cowl top 14 are connected with each other at one spot, and the flange portion 18A2 and the rear flange portion 14B are connected with each other at two spots. Thus, the cowl top 14 and the cowl brace 18 are connected with each other at a total of three spots. Therefore, the state in which the cowl brace 18 and the cowl top 14 are connected with each other can be stabilized. Accordingly, the vehicular cowl structure 10 according to this embodiment of the invention achieves a further improvement in NV performance through a simple configuration.

The second embodiment of the vehicular cowl structure according to the invention will be described hereinafter using FIGS. 8A and 8B and FIGS. 9A and 9B. Incidentally, components identical to those of the configuration of the cowl brace 18 of the vehicular cowl structure 10 according to the foregoing first embodiment of the invention are denoted by the same reference symbols respectively, and the description thereof is omitted.

As shown in FIGS. 8A and 8B, in the cowl brace 18 of the vehicular cowl structure 10 according to this second embodiment of the invention, a width dimension WL2 of the flange portion 18A2 as a width dimension of the upper portion 18A of the cowl brace 18 is set larger than a width dimension WL1 of the cowl brace body 18B in the vehicle width direction. In this case, the width dimension WL2 of the flange portion 18A2 is set approximately three times as large as the width dimension WL1 of the cowl brace body 18B. The cowl brace body 18B is formed in the central region of the flange portion 18A2 on the vehicle front side via the flexed portion 18a, and a pair of flange portions 18A1 are disposed on both sides of this cowl brace body 18B in the vehicle width direction respectively. That is, the cowl brace 18 according to this embodiment of the invention is provided with the two (a plurality of) flange portions 18A1 that have been partially cut.

The cowl brace 18 is basically manufactured in the same manner as the cowl brace 18 according to the first embodiment of the invention. That is, first of all, the contour of the entire cowl brace 18 including the contour of the flange portion 18A1 is cut off from a platy member through a cutting process. Then, the flange portion 18A2 is bent from the cowl brace body 18B rearward with respect to the vehicle, and the flange portion 18A1 is partially cut and raised from the cowl brace body 18B forward with respect to the vehicle. Besides, the cowl brace 18 may be manufactured by simultaneously performing the cutting process and the cut-up process.

Although not shown in detail, the pair of the flange portions 18A1 are provided, and therefore, the front flange portion 14A of the cowl top 14 is welded to the pair of the flange portions 18A1 at two welding spots W1 that are set on the vehicle front side. The rear flange portion 14B of the cowl top 14 on the vehicle rear side and the flange portion 18A2 of the cowl brace 18 are welded to each other at the two welding spots W2 that are set as in the case of the foregoing first embodiment of the invention, or at one welding spot W2 that is set at the central portion in the vehicle width direction.

Next, the operation and effect of this embodiment of the invention will be described. The vehicular cowl structure 10 according to this embodiment of the invention is equipped with a basic configuration similar to that of the foregoing first embodiment of the invention, and therefore an operation and an effect that are similar to those of the first embodiment of the invention are obtained. Furthermore, in the vehicular cowl structure 10 according to this embodiment of the invention, the closed cross-section portion 26 is formed over a wide range of the cowl top 18 in the vehicle width direction as viewed from beside the vehicle. Thus, the cowl top 14 is effectively restrained or prevented from being deformed in such a manner as to open in the vehicle longitudinal direction. Therefore, the support rigidity of the front windshield glass 32 is enhanced.

Figure 9B:
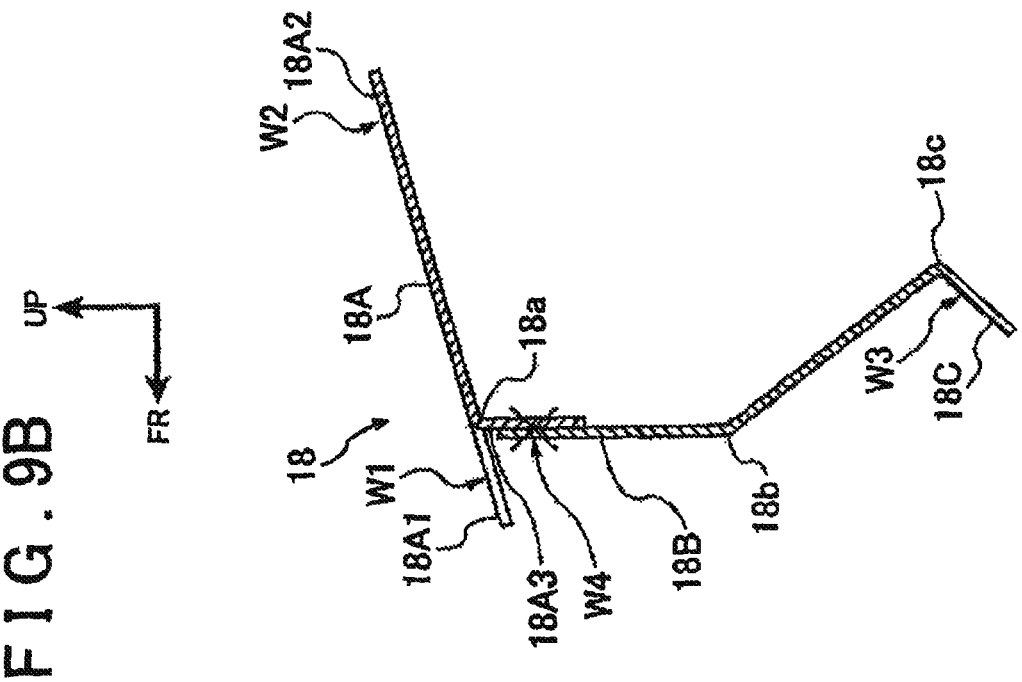
FIG. 9B is a cross-sectional view of the cowl brace shown in FIG. 9A as viewed from beside a vehicle.
Figure 9A:
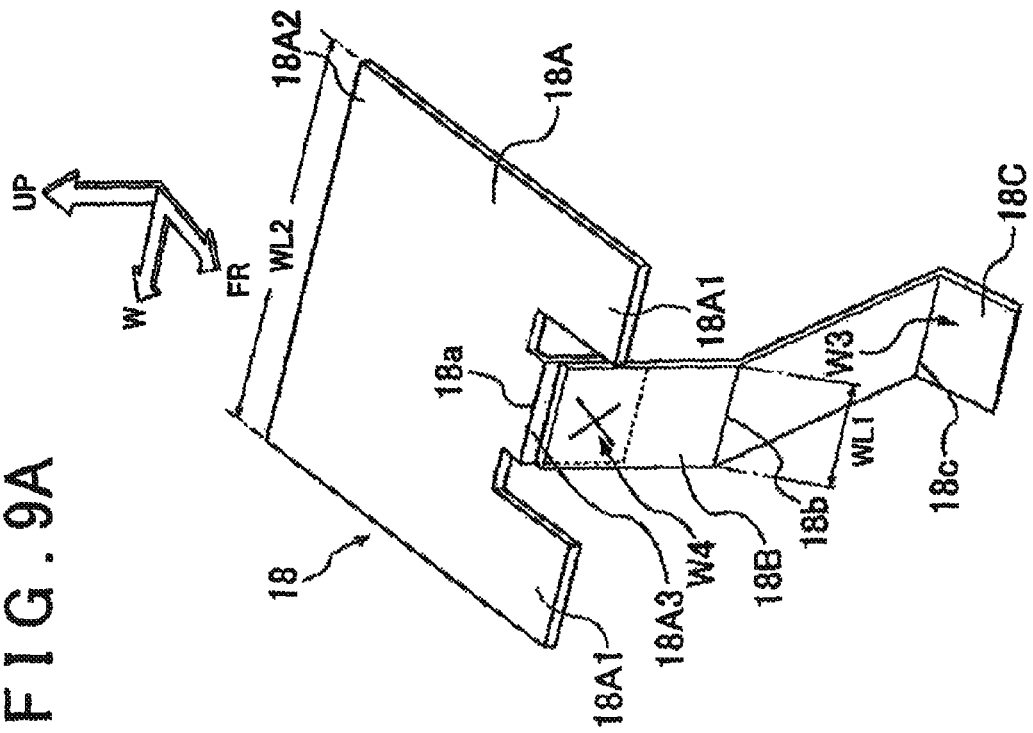
FIG. 9A is a perspective view of a cowl brace of a vehicular cowl structure according to a modification example of the second embodiment of the invention.

A modification example of the second embodiment of the invention will be described. As shown in FIGS. 9A and 9B, the cowl brace 18 of the vehicular cowl structure 10 according to this modification example is characterized in that the flange portions 18A1 and 18A2 are configured as members separate from the cowl brace body 18B. Incidentally, the cowl brace body 18B and the flange portion 18C are integrally formed as the same member.

A connection portion 18A3 that is bent from the flexed portion 18a downward with respect to the vehicle and extended is provided at the central portion of the flange portion 18A2 on the vehicle front side. In other words, when viewed from the connection portion 18A3 as a point of reference, the flange portion 18A2 is bent from the connection portion 18A3 rearward with respect to the vehicle, and the connection portion 18A3 is formed integrally with the flange portions 18A1 and 18A2. The length of the connection portion 18A3 is set such that the connection portion 18A3 does not reach the flexed portion 18b of the cowl brace body 18B. More specifically, the connection portion 18A3 is extended substantially to an intermediate point between the flexed portions 18a and 18b. The connection portion 18A3 is connected with the upper portion 18A of the cowl brace body 18B through spot welding or the like (see a welding spot W4).

Owing to the aforementioned configuration as well, an operation and an effect that are similar to those of the vehicular cowl structure 10 shown in FIGS. 8A and 8B are obtained. In particular, in the vehicular cowl structure 10 according to the modification example, the flange portions 18A1 and 18A2, which have a complicated contour, and the cowl brace body 18B and the flange portion 18C, which have the flexed portion 18b protruded forward with respect to the vehicle and the flexed portion 18c protruded rearward with respect to the vehicle respectively and are bent in a complicated shape, can be manufactured as separate members independently of one another.

The third embodiment of the vehicular cowl structure according to the invention will be described hereinafter using FIGS. 10A and 10B and FIGS. 11A and 11B. Incidentally, components identical to those of the configuration of the cowl brace 18 of the vehicular cowl structure 10 according to the foregoing first embodiment of the invention are denoted by the same reference symbols respectively, and the description thereof is omitted.

As shown in FIGS. 10A and 10B, in the vehicular cowl structure 10 according to this third embodiment of the invention, the width dimension WL2 of the flange portions 18A1 and 18A2 as a width dimension of the upper portion 18A of the cowl brace 18 is set approximately equal to the width dimension WL1 of the cowl brace body 18B in the vehicle width direction. The flange portions 18A1 and 18A2 are formed as platy members that are extended in the vehicle longitudinal direction (the long direction) and in the vehicle width direction (the short direction) respectively, and are integrally formed.

The cowl brace body 18B and the flange portion 18C are formed as members separate from the flange portions 18A1 and 18A2. A flange portion 18E that is bent from the flexed portion 18a rearward with respect to the vehicle is formed at the upper portion of the cowl brace body 18B, in such a manner as to overlap with the flange portion 18A2. The flange portion 18A2 is connected with the flange portion 18E through spot welding or the like (see a welding spot W5). It should be noted herein that the flange portion 18E is bent rearward with respect to the vehicle, and that the flange portion 18A2 is securely connected with this flange portion 18E through welding. Thus, the flange portion 18A2 is regarded as being bent substantially from the cowl brace body 18B rearward with respect to the vehicle.

(Operation and Effect of This Embodiment) The vehicular cowl structure 10 according to this embodiment of the invention is equipped with a basic configuration similar to that of the modification example of the foregoing second embodiment of the invention. Therefore, an operation and an effect that are similar to those of the modification example of the second embodiment of the invention are obtained.

Next, a modification example of the third embodiment of the invention will be described. As shown in FIGS. 11A and 11B, the cowl brace 18 of the vehicular cowl structure 10 according to this modification example is characterized in that the flange portion 18A1 is formed as a member separate from the flange portion 18A2, the cowl brace body 18B, and the flange portion 18C. The flange portion 18A2, the cowl brace body 18B, and the flange portion 18C are integrally formed as the same member. The flange portion 18A1 is overlapped with the flange portion 18A2, which is bent from the cowl brace body 18B at the flexed portion 18a rearward with respect to the vehicle and extended, on the vehicle front side. In this region, the flange portion 18A1 is connected with the flange portion 18A2 through spot welding or the like (see a welding spot W6). Owing to the aforementioned configuration as well, an operation and an effect that are similar to those of the vehicular cowl structure 10 according to the third embodiment of the invention shown in FIGS. 10A and 10B are obtained.

Incidentally, the invention is not limited to the foregoing plurality of the embodiments thereof or their modification examples. The invention can be modified in various manners without departing from the gist thereof. For example, in the invention, flange portions that are partially bent rearward with respect to the vehicle (or forward with respect to the vehicle) and extended in the vertical direction with respect to the vehicle and in the vehicle longitudinal direction may be disposed at both the ends of the cowl brace 18 in the vehicle width direction respectively. Due to the formation of these flange portions, the support rigidity of the cowl brace 18 in the vertical direction with respect to the vehicle is enhanced.

The invention claimed is:

1. A vehicular cowl structure comprising:
   a cowl top arranged along a lower end of a front windshield glass, the cowl top supporting the lower end of the front windshield glass;
   a cowl inner panel arranged below the cowl top, the cowl inner panel being arranged such that a longitudinal direction of the cowl inner panel is coincident with a vehicle width direction, and the cowl inner panel having, at an intermediate portion of the cowl inner panel in a vehicle height direction, a flexed portion protruded forward with respect to the vehicle; and
   a cowl brace arranged in front of the cowl inner panel with respect to the vehicle, the cowl brace being protruded along the vehicle height direction, the cowl brace having a lower portion of the cowl brace, an intermediate portion of the cowl brace and an upper portion of the cowl brace, a closed cross-section portion being defined by the cowl brace and the cowl inner panel, the lower portion being connected with the cowl inner panel, the intermediate portion being flexed in a same direction as the flexed portion, a part of the upper portion being protruded forward with respect to the vehicle and being connected with a front portion of the cowl top, and another part of the upper portion being bent rearward with respect to the vehicle and being connected with both a rear portion of the cowl top and an upper portion of the cowl inner panel.

2. The vehicular cowl structure according to claim 1, wherein
   the part of the upper portion of the cowl brace is partially cut and raised.

3. The vehicular cowl structure according to claim 2, wherein
   the part of the upper portion of the cowl brace has a flange portion located at a central portion of the cowl brace in the vehicle width direction.

4. The vehicular cowl structure according to claim 2, wherein
   the part of the upper portion of the cowl brace has a pair of flange portions located on both sides of the cowl brace respectively in the vehicle width direction.

5. The vehicular cowl structure according to claim 2, wherein
   the cowl brace includes the upper portion of the cowl brace, the lower portion of the cowl brace, and a cowl brace body located between the upper portion of the cowl brace and the lower portion of the cowl brace, and
   the upper portion of the cowl brace has a larger width dimension in the vehicle width direction than the cowl brace body.

6. The vehicular cowl structure according to claim 2, wherein
   the cowl brace includes the upper portion of the cowl brace, the lower portion of the cowl brace, and a cowl brace body located between the upper portion of the cowl brace and the lower portion of the cowl brace, and
   the upper portion of the cowl brace has a substantially same width dimension in the vehicle width direction as the cowl brace body.

7. The vehicular cowl structure according to claim 6, wherein the upper portion of the cowl brace is a member separate from the cowl brace body.

8. The vehicular cowl structure according to claim 1, wherein as viewed from the side of the vehicle, an intermediate portion of the cowl top in a vehicle longitudinal direction has a cross-sectional shape of a hat protruded upward in the vehicle height direction, a front flange portion of the cowl top is connected with the part of the upper portion of the cowl brace, and a rear flange portion of the cowl top is connected with the another part of the upper portion of the cowl brace, and another closed cross-section portion is defined by the cowl top and the upper portion of the cowl brace.

9. The vehicular cowl structure according to claim 8, wherein the part of the upper portion of the cowl brace is partially cut and raised at a central portion of the upper portion in the vehicle width direction, the part of the upper portion and the front flange portion are connected with each other at one spot, and the another part of the upper portion and the rear flange portion are connected with each other at two spots in the vehicle width direction.

\* \* \* \* \*